US012752724B2

(12) United States Patent
Moss et al.

(10) Patent No.: US 12,752,724 B2
(45) **Date of Patent: *Oct. 6, 2026**

(54) ELECTRIC CIRCUIT FOR A HIGH-VOLTAGE NETWORK OF A VEHICLE

(71) Applicant: Robert Bosch GmbH, Stuttgart (DE)

(72) Inventors: Ian Patrick Moss, Stuttgart (DE); Samuel Vasconcelos Araujo, Esslingen am Necker (DE)

(73) Assignee: Robert Bosch GmbH, Stuttgart (DE)

(*) Notice: Subject to any disclaimer, the term of this patent is extended or adjusted under 35 U.S.C. 154(b) by 768 days.

This patent is subject to a terminal disclaimer.

(21) Appl. No.: 18/104,388

(22) Filed: Feb. 1, 2023

(65) Prior Publication Data

US 2023/0242054 A1 Aug. 3, 2023

(30) Foreign Application Priority Data

Feb. 1, 2022 (DE) ........................ 102022201065.5

(51) Int. Cl.
*B60R 16/03* (2006.01)
*B60L 50/60* (2019.01)
(Continued)

(52) U.S. Cl.
CPC .............. *B60R 16/03* (2013.01); *B60L 50/60* (2019.02); *H02J 7/575* (2026.01); *H02J 2105/37* (2026.01)

(58) Field of Classification Search
CPC ....... B60R 16/03; B60R 16/033; B60L 50/60; B60L 3/0046; B60L 3/04; B60L 58/19;
(Continued)

(56) References Cited

U.S. PATENT DOCUMENTS 10,800,286 B2 * 10/2020 Doersam ................. B60L 58/19
10,919,467 B2 * 2/2021 Link ....................... B60L 50/51
(Continued)

FOREIGN PATENT DOCUMENTS

| | | |
|---|---|---|
| DE | 102015010531 A1 | 2/2017 |
| DE | 102016008052 A1 | 2/2017 |
| DE | 102021203352 A1 | 10/2022 |

OTHER PUBLICATIONS

M. Reuter, S. Tenbohlen and W. Köhler, "The Influence of Network Impedance on Conducted Disturbances Within the High-Voltage Traction Harness of Electric Vehicles," in IEEE Transactions on Electromagnetic Compatibility, vol. 56, No. 1, pp. 35-43, Feb. 2014 (Year: 2014).*

*Primary Examiner* — M Baye Diao
(74) *Attorney, Agent, or Firm* — Michael Best & Friedrich LLP

(57) ABSTRACT

An electric circuit (3) for a high-voltage network (2) of a vehicle. The high-voltage network (2) includes at least two electrical energy stores and one main electrical consumer. The electric circuit includes a first switching unit electrically connected to first and second pole connectors, and a second switching unit electrically connected to third and fourth pole connectors, and a third switching unit electrically connected to the third pole connector and the second pole connector. A fourth switching unit is connected to the first pole connector and a first consumer connection. A fifth switching unit is electrically connected to the fourth pole connector and a second consumer connection (23). The switching units are switchable between an electrically connecting and disconnecting states, and the fourth switching unit (12) and/or the fifth switching unit (13) are designed to be galvanically isolating in the electrically disconnecting state.

6 Claims, 2 Drawing Sheets

(51) Int. Cl.
*H02J 7/50* (2026.01)
*H02J 105/37* (2026.01)

(58) Field of Classification Search
CPC .. B60L 58/21; B60L 50/50; B60L 3/00; B60L 53/16; B60L 58/18; H02J 7/0024; H02J 2310/48; H02J 7/1423; Y02T 10/70; Y02T 10/7072; Y02T 90/14
USPC .......................................................... 320/104
See application file for complete search history.

(56) References Cited

U.S. PATENT DOCUMENTS

| | | | | |
|---|---|---|---|---|
| 12,172,533 | B2 * | 12/2024 | Krieg | B60L 3/00 |
| 2019/0199108 | A1 * | 6/2019 | Hiroe | B60L 53/11 |

* cited by examiner

ELECTRIC CIRCUIT FOR A HIGH-VOLTAGE NETWORK OF A VEHICLE

BACKGROUND OF THE INVENTION

The present invention relates to an electric circuit for a high-voltage network of a vehicle. The high-voltage network may comprise electrical energy stores and power electronics, such as a traction machine and an inverter. The electric circuit allows disconnection and closing of an electrical connection between the electrical energy stores and the remaining high-voltage network.

Current high-voltage networks for electric vehicles comprise one or more energy stores, at least one traction machine, a charging port, one or more auxiliary consumers (coolant compressors, continuous-flow heaters) and one or more inverters. If the electric vehicle comprises an energy store, the latter is connected to the remaining high-voltage network via two switching units. If the electric vehicle comprises a plurality of energy stores, a more complex connection of the electrical energy stores to the high-voltage network is necessary. Until now, this electrical connection between the electrical energy stores and the remaining high-voltage network has been realized by high-voltage relays. These high-voltage relays allow galvanic isolation of the electrical energy stores from the remaining high-voltage network and were therefore used for safety reasons.

SUMMARY OF THE INVENTION

An electric circuit for a high-voltage network of a vehicle, wherein the high-voltage network comprises at least two electrical energy stores and one main electrical consumer, comprises at least five switching units. A first switching unit is arranged between a first pole connector and a second pole connector. The first pole connector is configured to make electrical contact with a first pole of a first electrical energy store. The second pole connector is configured to make electrical contact with a first pole of a second electrical energy store.

A second switching unit is arranged between a third pole connector and a fourth pole connector. The third pole connector is configured to make electrical contact with a second pole of a first electrical energy store. The fourth pole connector is configured to make electrical contact with a second pole of a second electrical energy store. A third switching unit is arranged between the second pole connector and the third pole connector. A fourth switching unit is arranged between the first pole connector and a first consumer connection, to which the main consumer can be connected. A fifth switching unit is arranged between the fourth pole connector and a second consumer connection, to which the main electrical consumer can be connected.

The switching units are switchable between an electrically connecting state and an electrically disconnecting state. Due to this arrangement of the switching units, the first electrical energy store and the second electrical energy store can be connected both in series and in parallel. Due to this possibility, the total voltage of the first electrical energy store and of the second electrical energy store can be adjusted, wherein the total voltage of the first electrical energy store and of the second electrical energy store is higher in a series connection than in a parallel connection. The higher total voltage of the first electrical energy store and of the second electrical energy store as a result of a series connection allows a main electrical consumer to be supplied with power greater than that of a single electrical energy store with lower losses than would be the case with a parallel connection. The lower total voltage of the first electrical energy store and of the second electrical energy store as a result of a parallel connection allows both electrical energy stores to also be charged with chargers that have a lower charging voltage than the total voltage of both electrical energy stores in a series connection.

For a series connection of the first electrical energy store and the second electrical energy store, the third switching unit must be in an electrically connecting state and the first switching unit and the second switching unit must be in an electrically disconnecting state. For a parallel connection of the first electrical energy store to the second electrical energy store, the third switching unit must be in an electrically disconnecting state and the first switching unit, and the second switching unit must be in an electrically connecting state.

The fourth switching unit and the fifth switching unit allow the first electrical energy store and the second electrical energy store to be electrically disconnected from the remaining high-voltage network without interrupting a parallel connection of the first electrical energy store and of the second electrical energy store. The parallel connection of the first electrical energy store and of the second electrical energy store takes place exclusively by the second switching unit and the third switching unit. Furthermore, the fourth switching unit and/or the fifth switching unit are designed such that the fourth switching unit and/or the fifth switching unit are also galvanically isolated in an electrically disconnecting state. This allows safe disconnection of the first electrical energy store and of the second electrical energy store from the high-voltage network.

Furthermore, the first switching unit and/or the second switching unit and/or the third switching unit are designed as semiconductor components. Semiconductor components have significantly higher dynamics in their switching behavior, a higher service life, can be manufactured smaller than high-voltage relays, and can be more easily and more cost-effectively adapted to higher voltages. Due the design of the first switching unit and/or of the second switching unit and/or of the third switching unit as semiconductor components, short circuit currents, both in a series connection and in a parallel connection, can be interrupted more quickly than with a high-voltage relay. Due to the smaller design of the semiconductor components, more complex circuits, as required here for the switching between a series and a parallel connection of the first electrical energy store to the second electrical energy store, can be implemented with a smaller installation space increase than with high-voltage relays. Such a connection provides power to the electrical consumer with lower losses than would be the case with a parallel connection of the two electrical energy stores and allows charging the first electrical energy store and the second electrical energy store with charging sources having lower charging voltages than the total voltage of the two series-connected electrical energy stores.

Preferably, the first switching unit and/or the second switching unit and/or the third switching unit of the electric circuit comprise one or more transistors. Compared to simple diodes, transistors use a control voltage to allow a current flow to flow, even against the blocking direction thereof. As a result, a current flow in both directions can be allowed with a transistor, which would not be possible with a simple diode.

Particularly preferably, the first switching unit and/or the second switching unit and/or the third switching unit of the electric circuit each comprise two transistors arranged such that their blocking directions are opposite. Thus, one of the two transistors of the first switching unit and/or of the second switching unit and/or of the third switching unit always initially blocks a charging current or a discharging current of the first electrical energy store and/or of the second electrical energy store. Only by switching the transistor, against the blocking direction of which a current wants to flow, into an electrically connecting state can a charging current or a discharging current flow and the first electrical energy store and/or the second electrical energy store system can be charged or discharged.

More particularly preferably, the transistors of the first switching unit and/or of the second switching unit and/or of the third switching unit of the electric circuit are respectively connected to one another via their source side.

More particularly preferably, in an alternative embodiment, the transistors of the first switching unit and/or of the second switching unit and/or of the third switching unit of the electric circuit are respectively connected to one another via their drain side.

Preferably, the electric circuit comprises a charging port for the electrical connection to a charging unit for charging the electrical energy store. Here, the electric circuit comprises at least one sixth switching unit arranged between a charging port and the first pole connector, and a seventh charging port arranged between the charging port and the fourth pole connector. The charging port is configured to make electrical contact with a charging unit. Furthermore, the sixth switching unit and the seventh switching unit are switchable between an electrically disconnecting state and an electrically connecting state. Due to this connection of the charging unit to the first pole of the first electrical energy store and to the second pole of the second electrical energy store, the first electrical energy store and the second electrical energy store can be connected both in series and in parallel to the charging unit. As a result, the total voltage of the connection of the first electrical energy store and of the second electrical energy store can be adapted to the charging voltage of the charging unit. In the case of the build-up of an overvoltage in the first electrical energy store and/or in the second electrical energy store, it is possible to interrupt the circuit in a series connection by means of the third switching unit and in a parallel connection by means of the first switching unit and/or the second switching unit. Moreover, during the charging process, the fourth switching unit and the fifth switching unit can be in an electrically disconnecting state, thereby protecting the remaining high-voltage network from overvoltages during the charging process.

Preferably, the electric circuit comprises at least one eighth switching unit arranged between a third consumer connection and the first pole connector, and a ninth switching unit arranged between the charging port and the fourth pole connector. The consumer connection is configured to make electrical contact with an auxiliary electrical consumer. Here, the eighth switching unit and the ninth switching unit are switchable between an electrically disconnecting state and an electrically connecting state.

Due to the direct electrical connection of the eighth switching unit to the first pole of the first energy store and the direct electrical connection of the ninth switching unit to the second pole of the second energy store, it is possible to electrically connect the auxiliary consumer to the first electrical energy store and the second electrical energy store independently of the charging unit or the remaining high-voltage network. Here, a short-circuit current be prevented solely by switching the states of the first switching unit and/or of the second switching unit and/or of the third switching unit into an electrically disconnecting state. Since during a charging process, the charging unit is electrically connected via the charging port directly to the first pole connector and the fourth pole connector and the auxiliary consumer is electrically connected via the eighth switching unit and the ninth switching unit directly to the first pole connector and the fourth pole connector, it is also possible to supply power to the auxiliary consumer from the charging unit during a charging process. Furthermore, the eighth switching unit and/or the ninth switching unit may comprise one or more transistors. This makes it possible to interrupt the circuit between the charging unit and the auxiliary consumer as quickly as is possible between the charging unit and the first electrical energy store and/or the second electrical energy store by means of the first switching unit and/or the second switching unit and/or the third switching unit. This provides the possibility during a charging process of the first electrical energy store and of the second electrical energy store by means of the charging unit, with the charging unit simultaneously supplying the auxiliary consumer, and with an open electrical connection of the remaining high-voltage network to the first pole connector and the fourth pole connector, to carry out the disconnection of the electrical connections, in the event of an overvoltage and/or a short circuit, first by means of the first switching unit and/or the second switching unit and/or the third switching unit and to simultaneously disconnect the auxiliary consumer from the charging unit by means of the eighth switching unit and the ninth switching unit.

The invention also relates to a high-voltage network of a vehicle comprising a first battery as a first electrical energy store and a second battery as a second electrical energy store. The first battery and the second battery each have two non-identically named poles. Here, the first pole of the first battery is electrically connected to the first pole connector and the second pole of the first battery is electrically connected to the third pole connector. The first pole of the second battery is electrically connected to the second pole connector, and the second pole of the second battery is electrically connected to the fourth pole connector.

The invention also relates to a vehicle comprising a high-voltage network and an electric circuit. The electrical consumer of the electric circuit is preferably an electric vehicle drive comprising two non-identically named poles. Here, a first pole of the electric vehicle drive is electrically connected to the fifth switching unit, and a second pole of the electric vehicle drive is electrically connected to the sixth switching unit.

BRIEF DESCRIPTION OF THE DRAWINGS

Exemplary embodiments of the invention are described in detail below with reference to the accompanying drawing. The drawing shows.

DETAILED DESCRIPTION

Figure 1:
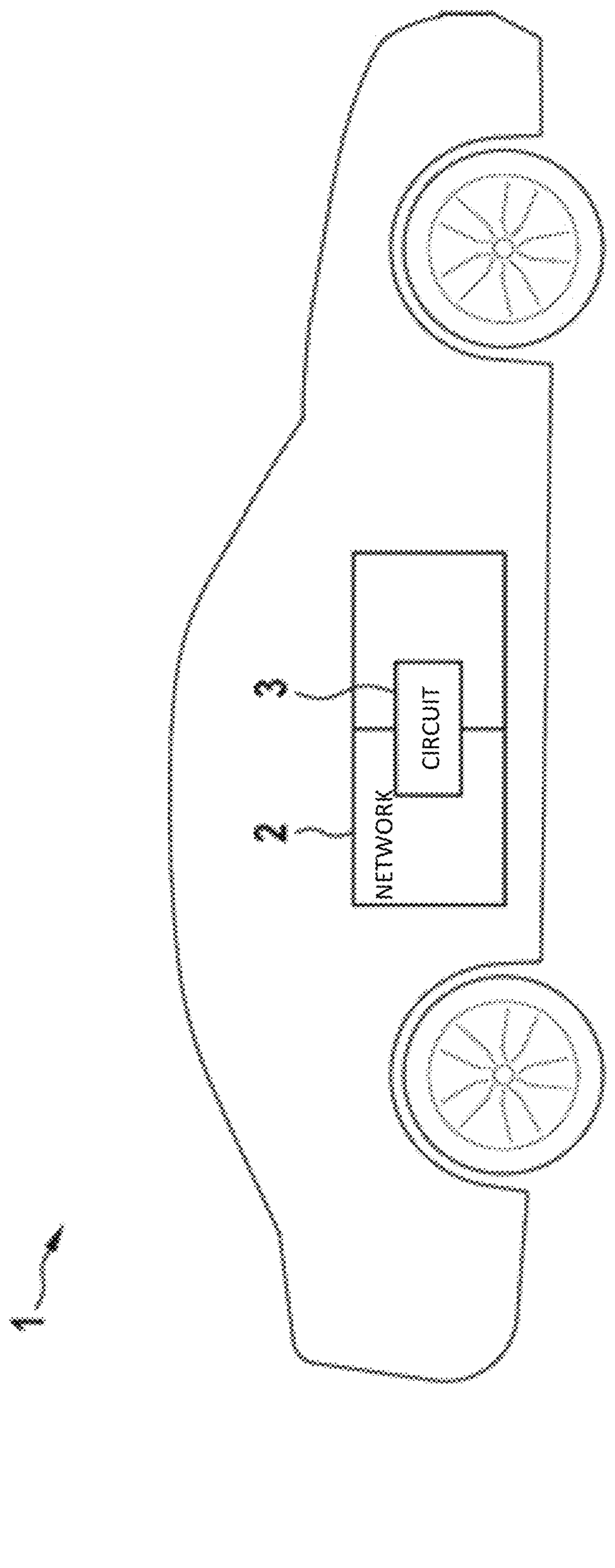
FIG. 1 a schematic view of a vehicle with a high-voltage network and an electric circuit according to an exemplary embodiment of the invention, and FIG. 2 a schematic illustration of the electric circuit of the exemplary embodiment of the invention with the high-voltage network, an auxiliary consumer and a charging unit.

FIG. 1 schematically shows a vehicle 1 comprising a high-voltage network 2 and an electric circuit 3 according to an exemplary embodiment of the invention. Here, the high-voltage network 2 and the electric circuit 3 are electrically connected to one another.

Figure 2:
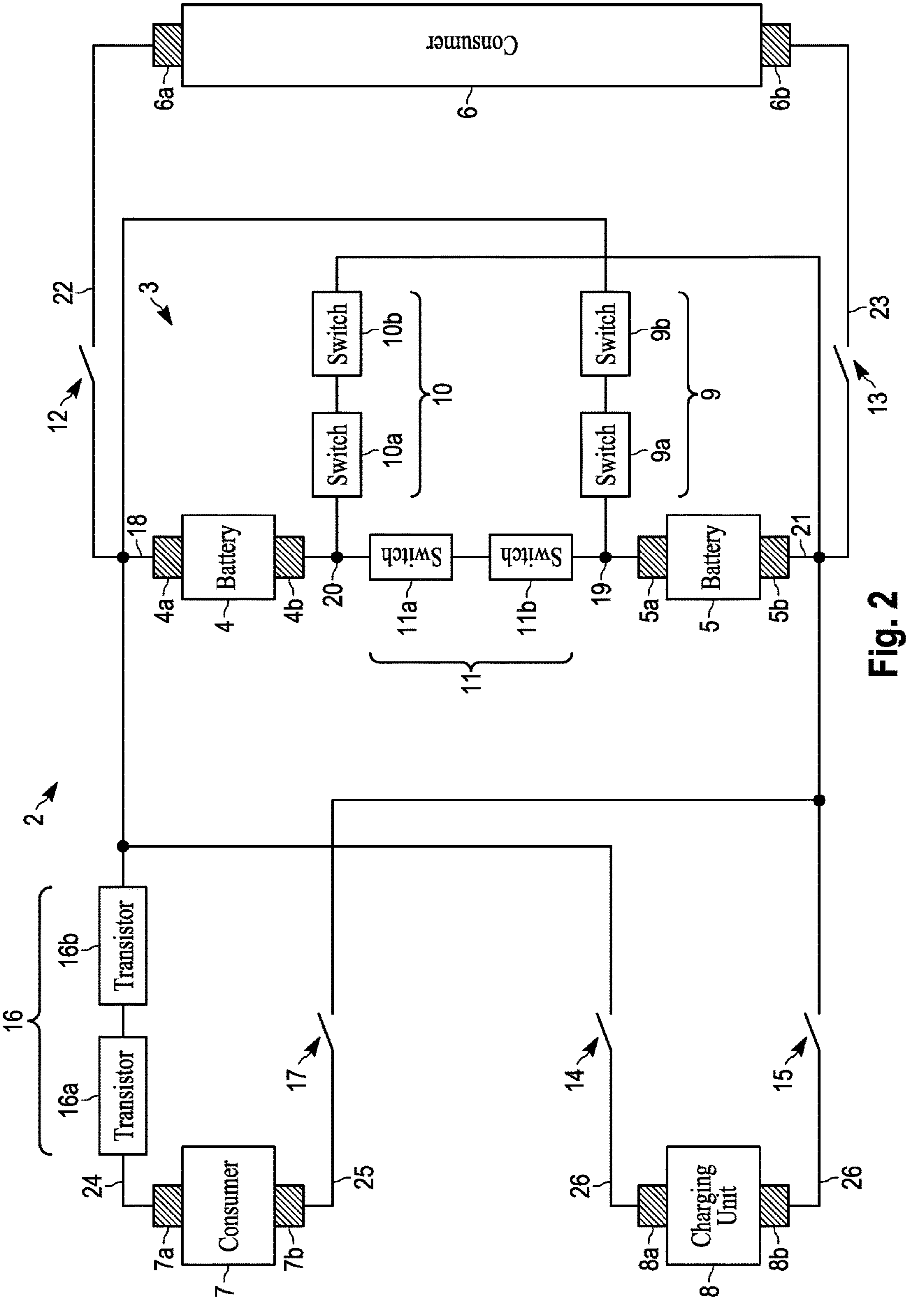

FIG. 2 schematically shows the high-voltage network 2 and the electric circuit 3, which is electrically connected to the high-voltage network 2. The high-voltage network 2 comprises a first battery 4 with a first pole 4*a* and a second pole 4*b* and a second battery 5 with a first pole 5*a* and a second pole 5*b*. The poles 4*a*, 4*b*, 5*a*, 5*b* of the first battery 4 and of the second battery 5 are in each case non-identically named.

The electric circuit 3 comprises a first switching unit 9, which is electrically connected to a first pole connector 18 and a second pole connector 19. Here, the first pole connector 18 is configured to make electrical contact with the first pole 4*a* of the first battery 4, and the second pole connector 19 is configured to make electrical contact with the first pole 5*a* of the second battery 5. Moreover, the electric circuit 3 comprises a second switching unit 10, which is electrically connected to a third pole connector 20 and a fourth pole connector 21. The third pole connector 20 is electrically connected to the second pole 4*b* of the first battery 4, and the fourth pole connector 21 is electrically connected to the second pole 5*b* of the second battery 5.

A third electrical switching unit 11 is electrically connected to the second pole connector 19 and the third pole connector 20.

The first switching unit 9, the second switching unit 10 and the third switching unit 11 are each configured as two transistors which are arranged against their blocking directions and are switchable between an electrically disconnecting state and an electrically connecting state. Due to this implementation of the switching units 9, 10, 11, a current flow via the switching units 9, 10, 11 is prevented in both directions since the current must flow against a blocking direction of a transistor. Only by switching the transistor, the blocking direction of which is against the current flow, into an electrically connecting state is a current flow made possible.

If the third switching unit 11 is in an electrically connecting state while the first switching unit 9 and the second switching unit 10 are in an electrically disconnecting state, a series connection of the first battery 4 to the second battery 5 is made possible. If the first switching unit 9 and the second switching unit 10 are in an electrically connecting state while the third electrical switching unit 11 is in an electrically disconnecting state, the first battery 4 and the second battery 5 are connected to one another in parallel.

The series and the parallel connection of the first battery 4 to the second battery 5 is possible due to the above-described configuration of the first switching unit 9, the second switching unit 10 and the third switching unit 11 both during the charging and during the discharging of the first battery 4 and of the second battery 5 since one of the two transistors of each switching unit 9, 10, 11 always blocks the current until this transistor is switched into an electrically connecting state. Due to the use of transistors instead of high-voltage relays, the first switching unit 9, the second switching unit 10 and the third switching unit 11 have a higher service life and better switching dynamics since transistors do not have any mechanical components. Moreover, transistors can be manufactured significantly smaller than high-voltage relays and therefore require less space than the high-voltage relays.

The high-voltage network 2 moreover comprises a main electrical consumer 6, which comprises two non-identically named poles 6*a*, 6*b*. A first pole 6*a* of the main electrical consumer 6 is electrically connected to the first consumer connection 22. The second pole 6*b* of the main electrical consumer 6 is electrically connected to the second consumer connection 23.

A fourth switching unit 12 is electrically connected to the first pole connector 18 and the first consumer connection 22, and a fifth switching unit 13 is electrically connected to the fourth pole connector 21 and the second consumer connection 23. The fourth switching unit 12 and the fifth switching unit 13 are switchable between an electrically disconnecting state and an electrically connecting state. Here, the fourth switching unit 12 and the fifth switching unit 13 are designed to be galvanically isolating in an electrically disconnecting state. Due to this arrangement, the fourth switching unit 12 and the fifth switching unit 13 allow an electrical disconnection of the main electrical consumer 6 without interrupting the parallel connection of the first battery 4 to the second battery 5.

The electrical disconnection of the current circuit, for example in the event of a short circuit or a thermal runaway of the first battery 4 or of the second battery 5, can thus be implemented solely by the transistors of the first switching unit 9 and of the second switching unit 10 and of the third switching unit 11. Since the transistors do not have any mechanical components necessary for switching between an electrically disconnecting state and an electrically connecting state, they can be switched much more quickly than high-voltage relays.

In FIG. 2, the high-voltage network 2 is connected to a charging unit 8. The charging unit 8 has two non-identically named poles 8*a*, 8*b*, which are electrically connected to a charging port 26. A sixth switching unit 14 is electrically connected to the charging port 26 and the first pole connector 18, and a seventh switching unit 15 is electrically connected to the charging port 26 and the fourth pole connector 21. The sixth switching unit 14 and the seventh switching unit 15 are switchable between an electrically disconnecting state and an electrically connecting state.

In addition, the high-voltage network 2 has an auxiliary consumer 7, which comprises two non-identically named poles 7*a*, 7*b*. A first pole 7*a* of the auxiliary electrical consumer 7 is electrically connected to a third consumer connection 24. A second pole 7*b* of the auxiliary electrical consumer 7 is electrically connected to a fourth consumer connection 25. An eighth switching unit 16 is electrically connected to the third consumer connection 24 and the first pole connector 18. A ninth switching unit 17 is electrically connected to the fourth consumer connection 21 and the fourth pole connector 21. The eighth switching unit 16 comprises two transistors 16*a*, 16*b* which are arranged against their blocking directions and are switchable between an electrically disconnecting state and an electrically connecting state.

The ninth switching unit 17 can be switched between an electrically disconnecting state and an electrically connecting state; in particular, the ninth switching unit 17 is galvanically isolating in an electrically disconnecting state. Due to the ninth switching unit 17, galvanic isolation can be ensured and due to the two transistors 16*a*, 16*b* of the eighth switching unit 16, a disconnection of the circuit between the auxiliary electrical consumer 7 and the remaining high-voltage network 2 is made possible more quickly than with a high-voltage relay.

Due to the electrical contact of the main electrical consumer 6, the auxiliary electrical consumer 7 and the charging unit 8 with the first pole connector 18 and the fourth pole connector 21, the first battery 4 and the second battery 5 can be connected to all three mentioned electrical units 6, 7, 8 in parallel or in series.

For a charging process, the fourth switching unit 12 and/or the fifth switching unit 13 can thus be in an electrically disconnecting state, whereby the first battery 4 and the second battery 5 are connected to one another in parallel. As a result, the total voltage of the first battery 4 and the second battery 5 thus corresponds to the individual voltage of one battery 4, 5 and is thus less compared to a series connection. This allows the first battery 4 and the second battery 5 to also be charged by a charging unit 8 with a charging voltage less than the total voltage of a series connection of the first battery 4 and the second battery 5. During the charging process, the auxiliary electrical consumer 7 may simultaneously be supplied by the charging current of the charging unit 8 via the eighth switching unit 16 and the ninth switching unit 17.

Since the main electrical consumer 6 is disconnected from the remaining high-voltage network during the charging process, the circuit can be disconnected in the event of a short circuit or a thermal runaway of the first battery 4 or of the second battery 5 by the transistors of the first switching unit 9, of the second switching unit 10 or of the third switching unit 11 without exposing the main consumer 6 to the charging voltage 8. If the main consumer 6 is connected directly to the charging unit 8 without being operated, this could lead to an overvoltage in the main consumer 6. In this case, the auxiliary electrical consumer 7 can disconnect the circuit between the charging unit 8 and the auxiliary electrical consumer 7 just as quickly by means of the transistors 16*a*, 16*b* of the eighth switching unit 16 and protect the auxiliary electrical consumer 7 from an overvoltage by the charging unit 8 in the case of an interrupted circuit between the first battery 4 and the second battery 5.

For a discharging process, the fourth switching unit 12 and the fifth 13 switching unit can be in an electrically connecting state and the sixth switching unit 14 and the seventh switching unit 15 can be in an electrically disconnecting state. The auxiliary electrical consumer 7 can now be supplied by the discharging current of the first battery 4 and of the second battery 5. In order to supply the main electrical consumer 6 with a higher voltage than the voltage of a single battery 4, 5, the first battery 4 and the second battery 5 can be connected in series.

The invention claimed is:

1. An electric circuit (3) for a high-voltage network (2) of a vehicle (1), wherein the high-voltage network (2) includes at least two electrical energy stores (4, 5) and one main electrical consumer (6), the electric circuit (3) comprising:

at least one first switching unit (9) arranged between a first pole connector (18) configured to make electrical contact with a first pole (4*a*) of a first electrical energy store (4), and a second pole connector (19) configured to make electrical contact with a first pole (Sa) of a second electrical energy store (5), at least one second switching unit (10) arranged between a third pole connector (20) configured to make electrical contact with a second pole (4*b*) of a first electrical energy store (4), and a fourth pole connector (21) configured to make electrical contact with a second pole (Sb) of a second electrical energy store (5), at least one third switching unit (11) arranged between the second pole connector (19) and the third pole connector (20), at least one fourth switching unit (12) arranged between the first pole connector (18) and a first consumer connection (22), to which the main consumer (6) can be connected, and at least one fifth switching unit (13) arranged between the fourth pole connector (21) and a second consumer connection (23), to which the main consumer (6) can be connected, wherein the switching units (9, 10, 11, 12, 13) are switchable between an electrically connecting state and an electrically disconnecting state, wherein the fourth switching unit (12) and/or the fifth switching unit (13) are configured to be galvanically isolating in an electrically disconnecting state, and wherein the first switching unit (9) and/or the second switching unit (10) and/or the third switching unit (11) are configured as semiconductor components, wherein at least one eighth switching unit (16) arranged between a third consumer connection (24), to which an auxiliary electrical consumer (7) can be connected, and the first pole connector (18), and at least one ninth switching unit (17) arranged between a fourth consumer connection (25), to which an auxiliary electrical consumer (7) can be connected, and the fourth pole connector (21), wherein the eighth switching unit (16) and the ninth switching unit (17) are switchable between an electrically connecting state and an electrically disconnecting state, and wherein the eighth switching unit (16) and/or the ninth switching unit (17) comprise one/or more transistors (16*a*, 16*b*).

2. The electric circuit (3) according to claim 1, wherein the first switching unit (9) and/or the second switching unit (10) and/or the third switching unit (11) comprise one or more transistors (9*a*, 9*b*, 10*a*, 10*b*, I la, I lb).

3. An electric circuit (3) for a high-voltage network (2) of a vehicle (1), wherein the high-voltage network (2) comprises at least two electrical energy stores (4, 5) and one main electrical consumer (6), the electric circuit (3) comprising:

at least one first switching unit (9) arranged between a first pole connector (18) configured to make electrical contact with a first pole (4*a*) of a first electrical energy store (4), and a second pole connector (19) configured to make electrical contact with a first pole (5*a*) of a second electrical energy store (5), at least one second switching unit (10) arranged between a third pole connector (20) configured to make electrical contact with a second pole (4*b*) of a first electrical energy store (4), and a fourth pole connector (21) configured to make electrical contact with a second pole (5*b*) of a second electrical energy store (5), at least one third switching unit (11) arranged between the second pole connector (19) and the third pole connector (20), at least one fourth switching unit (12) arranged between the first pole connector (18) and a first consumer connection (22), to which the main consumer (6) can be connected, and #at least one fifth switching unit (13) arranged between the fourth pole connector (21) and a second consumer connection (23), to which the main consumer (6) can be connected, wherein the switching units (9, 10, 11, 12, 13) are switchable between an electrically connecting state and an electrically disconnecting state, wherein the fourth switching unit (12) and/or the fifth switching unit (13) are configured to be galvanically isolating in an electrically disconnecting state, wherein the first switching unit (9) and/or the second switching unit (10) and/or the third switching unit (11) are configured as semiconductor components, and wherein the first switching unit (9) and/or the second switching unit (10) and/or the third switching unit (11) each comprise two transistors (9*a*, 9*b*, 10*a*, IOb, I la, I lb), which are in each case arranged such that their blocking directions are opposite.

4. The electric circuit (3) according to claim 3, wherein the transistors (9*a*, 9*b*, 10*a*, IOb, I la, I lb) of the first switching unit (9) and/or of the second switching unit (10) and/or of the third switching unit (11) are in each case arranged such that their source sides are electrically connected to one another.

5. The electric circuit (3) according to claim 1, wherein a charging port (26) for connection to a charging unit (8) for charging the electrical energy stores (4, 5), the electric circuit (3) comprising:

at least one sixth switching unit (14) arranged between a charging port (26), configured to make electrical contact with a charging unit (8), and the first pole connector (18), and at least one seventh switching unit (15) connected between the charging port (26) and the fourth pole connector (21), wherein the sixth switching unit (14) and the seventh switching unit (15) are switchable between an electrically connecting state and an electrically disconnecting state.

6. A high-voltage network (2) of a vehicle (1) comprising an electric circuit (3) according to claim 1, a first battery (4) with two non-identically named poles (4*a*, 4*b*) as a first electrical energy store (4) and a second battery (5) with two non-identically named poles (Sa, Sb) as a second electrical energy store (5), wherein the first pole (4*a*) of the first battery (4) is electrically connected to the first pole connector (18), and the second pole (4*b*) of the first battery (4) is electrically connected to the third pole connector (20), and the first pole (Sa) of the second battery (5) is electrically connected to the second pole connector (19), and the second pole (Sb) of the second battery (5) is electrically connected to the fourth pole connector (21).

* * * * *